(12) United States Patent
Barnett

(10) Patent No.: US 6,416,138 B1
(45) Date of Patent: Jul. 9, 2002

(54) SLAVE OPERATED SELF-CONTAINED HYDRAULIC BRAKE SYSTEM FOR TOWED TRAILERS AND OTHER VEHICLES

(76) Inventor: William Lunceford Barnett, 2900 Cottonwood La., Colleyville, TX (US) 76034

( * ) Notice: Subject to any disclaimer, the term of this patent is extended or adjusted under 35 U.S.C. 154(b) by 0 days.

(21) Appl. No.: 09/718,724

(22) Filed: Nov. 22, 2000

Related U.S. Application Data

(60) Provisional application No. 60/167,454, filed on Nov. 24, 1999.

(51) Int. Cl.⁷ .................................................. B60T 8/40
(52) U.S. Cl. .............................. 303/116.2; 303/115.2; 303/124; 303/3; 188/156
(58) Field of Search ............................. 303/3, 7, 9.61, 303/15, 123, 124, 115.2; 188/156, 72.6

(56) References Cited

U.S. PATENT DOCUMENTS

| | | | | |
|---|---|---|---|---|
| 3,887,238 A | * | 6/1975 | Bennett | 303/7 |
| 4,756,391 A | * | 7/1988 | Agarwal et al. | 188/106 P |
| 4,895,227 A | * | 1/1990 | Grenier et al. | 188/173 |
| 5,148,894 A | * | 9/1992 | Eddy | 303/72.6 |
| 5,302,008 A | * | 4/1994 | Miyake et al. | 303/14 |
| 5,348,123 A | | 9/1994 | Takahashi et al. | 188/72.1 |
| 5,439,278 A | * | 8/1995 | Tsukamoto et al. | 303/115.2 |
| 5,484,193 A | * | 1/1996 | Fuller et al. | 303/113.1 |
| 5,667,283 A | * | 9/1997 | Drennen et al. | 303/115.2 |
| 5,788,341 A | * | 8/1998 | Penrod et al. | 303/115.2 |
| 5,826,953 A | * | 10/1998 | Heubner | 303/122.13 |
| 5,876,100 A | * | 3/1999 | Breclmer et al. | 303/7 |
| 6,024,422 A | * | 2/2000 | Drennen et al. | 303/115.2 |
| 6,036,282 A | * | 3/2000 | Clarke et al. | 303/7 |
| 6,079,792 A | * | 6/2000 | Kessler | 303/7 |
| 6,135,575 A | | 10/2000 | Feigel et al. | 303/113.4 |
| 6,152,544 A | * | 11/2000 | Greaves | 303/7 |

FOREIGN PATENT DOCUMENTS

| | | |
|---|---|---|
| DE | 31 09 495 A1 | 12/1981 |
| DE | 34 30 981 A1 | 3/1986 |
| DE | 40 20 448 A1 | 1/1992 |
| DE | 42 29 042 A1 | 3/1993 |
| DE | 43 12 524 A1 | 10/1994 |
| DE | 44 13 579 A1 | 10/1995 |
| DE | 44 45 975 A1 | 6/1996 |
| DE | 197 58 289 A1 | 7/1999 |
| GB | 2 270 355 A | 3/1994 |
| WO | WO 89/08571 | 9/1989 |
| WO | WO 94/24453 | 10/1994 |

* cited by examiner

*Primary Examiner*—Paul N. Dickson
*Assistant Examiner*—Devon Kramer
(74) *Attorney, Agent, or Firm*—Jenkens & Gilchrist

(57) ABSTRACT

A slave operated self-contained hydraulic brake system having an electric motor that is mounted on a gear housing. The electric motor moves a threaded rod in a lateral direction. Movement in a first direction results in contact of the rod with a master cylinder piston assembly within a master cylinder. Movement of the master cylinder piston assembly forces hydraulic fluid out of the master cylinder to actuate brakes of a towed vehicle. A pressure sensor is attached to the master cylinder and measures the hydraulic fluid pressures in master cylinder chamber. Movement of the rod in a second direction is detected by a reverse limit switch. Electrical signals are used to control the slave operated self-contained hydraulic brake system. The brake system communicates electrically with a brake control board. Sensors may be provided to provide information to a microprocessor on the control board to add control features to the brake system.

21 Claims, 10 Drawing Sheets

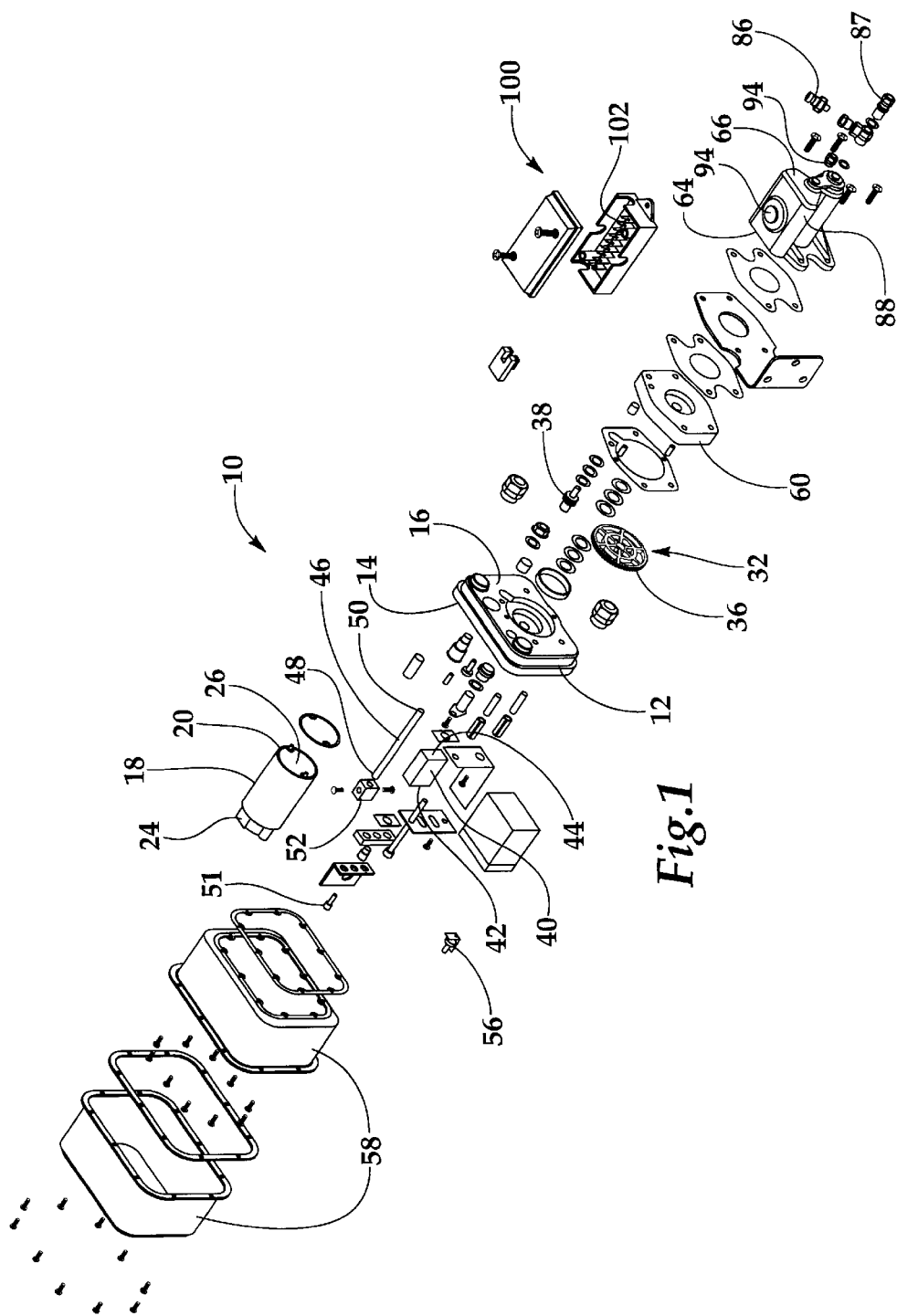

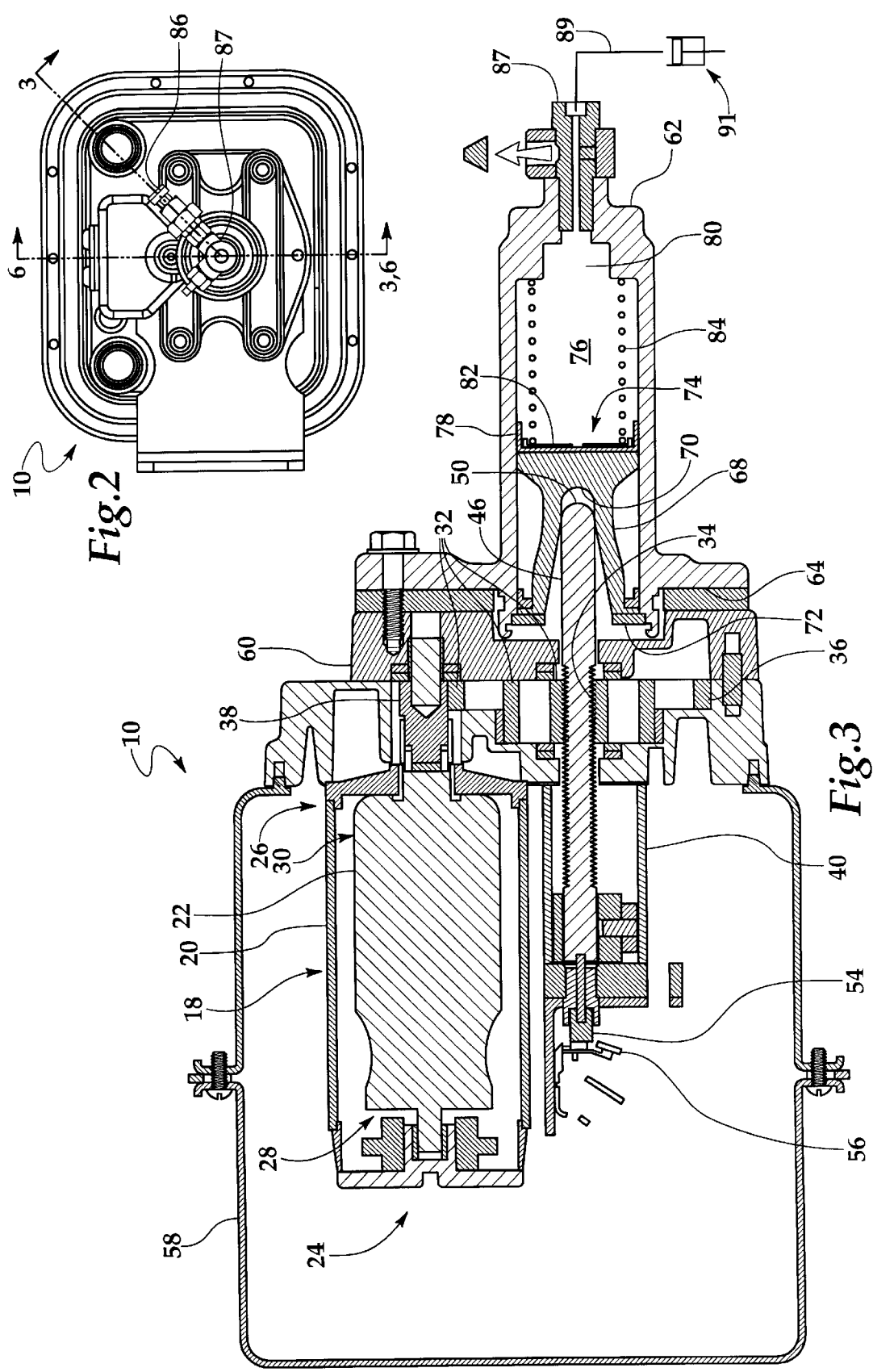

SLAVE OPERATED SELF-CONTAINED HYDRAULIC BRAKE SYSTEM FOR TOWED TRAILERS AND OTHER VEHICLES

RELATED APPLICATION(S)

This application relates to provisional application Ser. No. 60/167,454 filed on Nov. 24, 1999.

TECHNICAL FIELD

The present invention relates to hydraulic brake systems, specifically to electronically and microprocessor controlled slave operated hydraulic brake systems that can be used as an independent brake system for towed trailers that operate in conjunction with the towing vehicle brake system.

BACKGROUND OF THE INVENTION

Typical hydraulic brake technology is based upon the use of a hydraulic accumulator boosted by a hydraulic pump. These brakes are powered and operated by the application of pressurized hydraulic fluid, which is supplied by a hydraulic accumulator. The accumulator is necessary for the brake system to provide a sufficient amount or volume of hydraulic fluid at a high enough pressure to actuate the braking system. In turn, a conventional hydraulic piston pump supplies the pressurized hydraulic fluid in the accumulator. For the accumulator to remain charged, the hydraulic pump must run continuously. Electric power is supplied to the hydraulic pump by the electric power system of the towing vehicle. A problem with typical hydraulic brake technology is that law requires that in the event that a trailer should become unattached from the towing vehicle, i.e., "breakaway" mode, the trailer brake systems must be able to apply the trailer brakes immediately and to keep the trailer brakes applied for 15 minutes. To achieve trailer brake application for 15 minutes, conventional hydraulic brake systems must keep the brake accumulator charged. The hydraulic pump must run for the duration of the fifteen minutes to maintain brake application. During the period of detachment from the towing vehicle, the electric power requirements of the hydraulic pump must be met by a separate battery carried by the trailer as part of the trailer brake system. The separate battery provides power for the brake system to lock the brake down after breakaway. A brake system that is capable of meeting the 15 minute brake application requirement but which does not require continuous running of a hydraulic pump is desirable.

SUMMARY OF THE INVENTION

An electrically operated hydraulic brake system is provided that has an electric motor that is mounted on a gear housing. A motor armature preferably has a 3" shaft with a pinion gear attached to it. The pinion gear comes in contact with a spur gear. The spur gear, on its internal diameter, has an internal acme thread cut into it as an integral part of the gear body. The acme threaded rod has a matching external acme thread cut into its body that threads into the internal acme threads on the spur gear. The acme threaded rod comes in contact with the master cylinder piston assembly. The acme threaded rod is centered within a torque tube by a torque tube bearing. A master cylinder piston assembly is contained within a master cylinder, which also contains hydraulic fluid and a master cylinder spring. A pressure sensor is attached to the master cylinder and measures the hydraulic fluid pressure in the master cylinder chamber. The full reverse travel position of the acme threaded rod is detected by a reverse limit switch, which signals for the electric motor to stop.

A metal enclosure is attached to the gear housing that is attached to a master cylinder adapter to which the master cylinder is attached. Attached to the end of the master cylinder is the pressure sensor. The acme threaded rod extends through the spur gear, and the pinion gear comes in contact with the spur gear. The spur gear and pinion gear operate within the gear housing.

Electrical signals are used to control the slave operated self-contained hydraulic brake system. Three wires communicate the towing vehicle and the slave operated brake system, i.e., the brake system, that communicates electrically with a brake control board. One of these wires is a ground wire, another is a power wire to operate the brake system and the third is the brake signal wire that is used to actuate the brakes. The brake control board has three wires connected to a gear tooth counter, two wires to the brake system backup battery and four wires to control the brake system electric motor. Four additional sensors send signals to the brake control board. The four sensors include the pressure sensor with three wires, the master cylinder fluid level sensor with two wires, a load sensor with three wires and an anti-lock brake sensor with five wires. These sensors provide additional information to the microprocessor to add other control features to the brake system, such an anti-lock braking. The fluid level sensor will facilitate notification of low fluid conditions to the vehicle operator.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1 is an exploded view of the slave operated self-contained hydraulic brake system.

FIG. 2 is an end view of a slave operated self-contained hydraulic brake system.

FIG. 3 is a cutaway sectional view of the slave operated self-contained hydraulic brake system of FIG. 1 taken along section line 3—3 of FIG. 2.

DETAILED DESCRIPTION

Figure 1A:
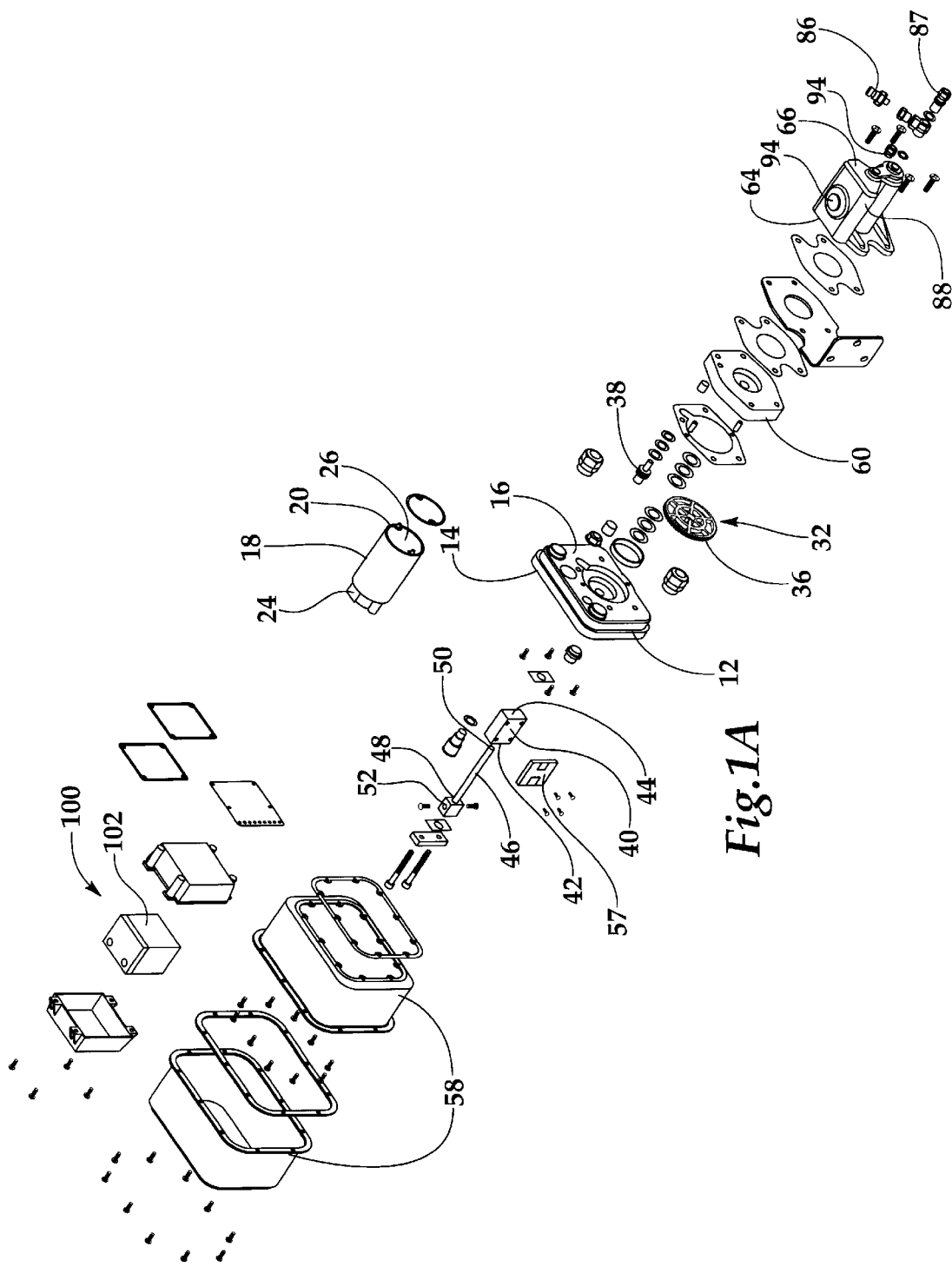
FIG. 1A is an exploded view of a second embodiment of the slave operated self-contained hydraulic brake system having a solid state rather than a mechanical reverse limit switch.

Referring now to the figures and more particularly to FIGS. 1 through 6, shown is a hydraulic brake system 10. Hydraulic brake system 10 has a gear housing 12 having a first side 14 and a second side 16. An electric motor 18 has a motor housing 20 and a motor armature 22 (FIG. 3). Electric motor 18 is preferably a 12 volt DC motor. The motor housing 20 has a first end 24 and a second end 26. The second end 26 of the electric motor housing 20 is affixed to the first side 14 of the gear housing 12. Motor armature 22 has a first end 28 and a second end 30. The motor armature 22 is rotatably mounted within the motor housing 20. The second end 30 of the motor armature 22 is located proximate the gear housing 12.

A spur gear 32 is rotatably mounted on the first side 14 of the gear housing 12. Spur gear 32 preferably has 75 teeth and has internal threads 34 and external threads 36. A pinion gear 38 is also rotatably affixed to the first side 14 of the gear housing 12. The pinion gear 38 preferably has 15 teeth and is affixed to the motor armature 22. Pinion gear 38 is in communication with the external threads 36 of the spur gear 32.

A torque tube 40 has a first end 42 and a second end 44. The second end 44 of the torque tube is affixed to the first side 14 of the gear housing 12. A threaded rod 46 also has a first end 48 and a second end 50. The threaded rod 46 extends through the gear housing 12 and is threadably coupled to the internal thread 34 of the spur gear 32. The first end 48 of the threaded rod 46 is rotatably mounted within a bearing 52 within torque tube 40. The second end 50 of the threaded rod 46 extends from the second side 16 of the gear housing 12.

In the embodiment shown in FIGS. 1 and 2–6, a switch activator 54 is slidably received within first end 42 of the torque tube 40. A reverse limit switch 56 is mounted on the first end 42 of the torque tube 40 and is located proximate the first end 48 of the threaded rod 46. A metal housing 58 is affixed to the first side 14 of the gear housing 12. The metal housing 58 surrounds the electric motor 18 and the torque tube 40.

Figure 3A:
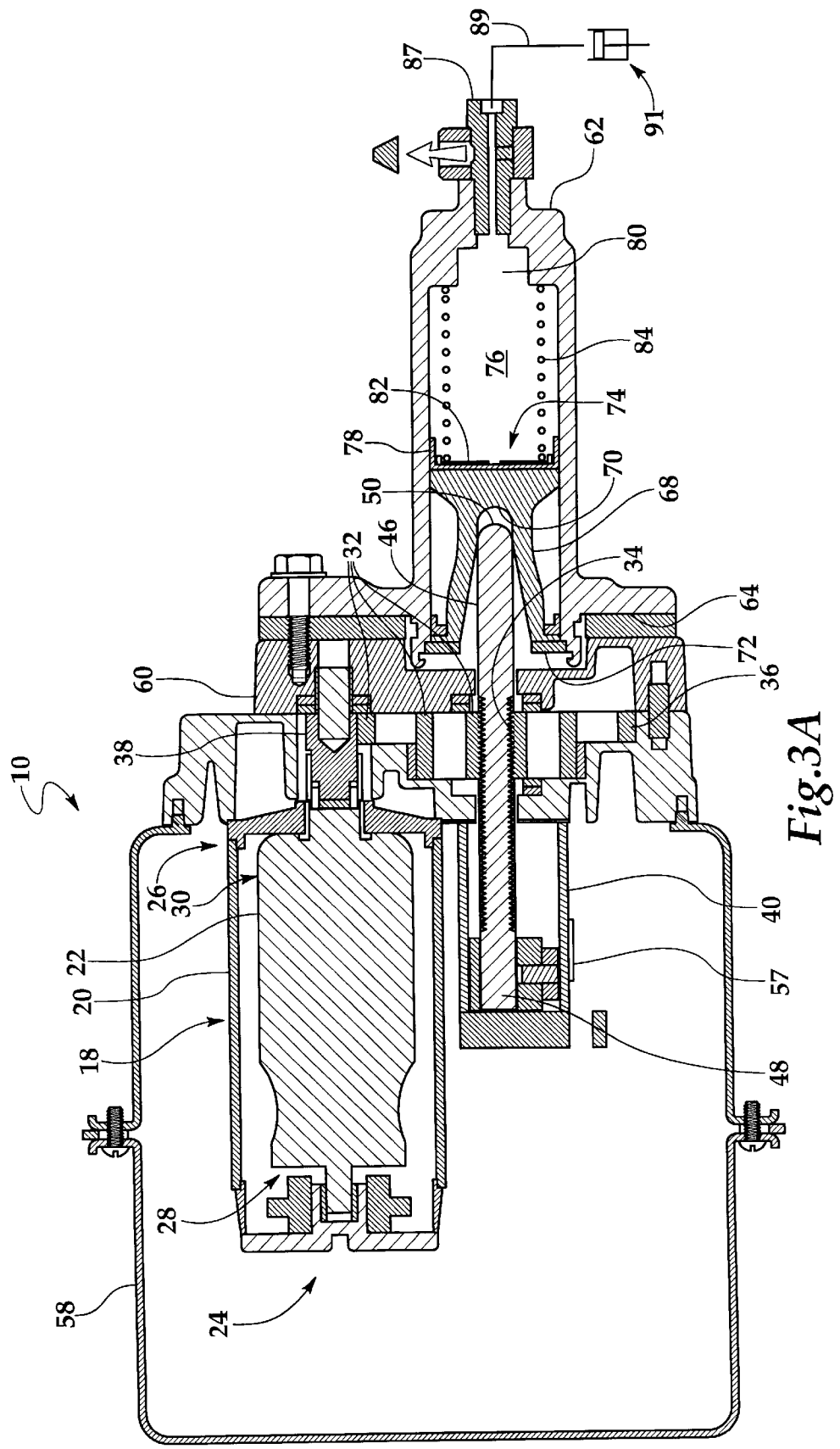
FIG. 3A is a cutaway sectional view of the slave operated self-contained hydraulic brake system of FIG. 1A taken along section line 3—3 of FIG. 2.
Figures 4, 5:
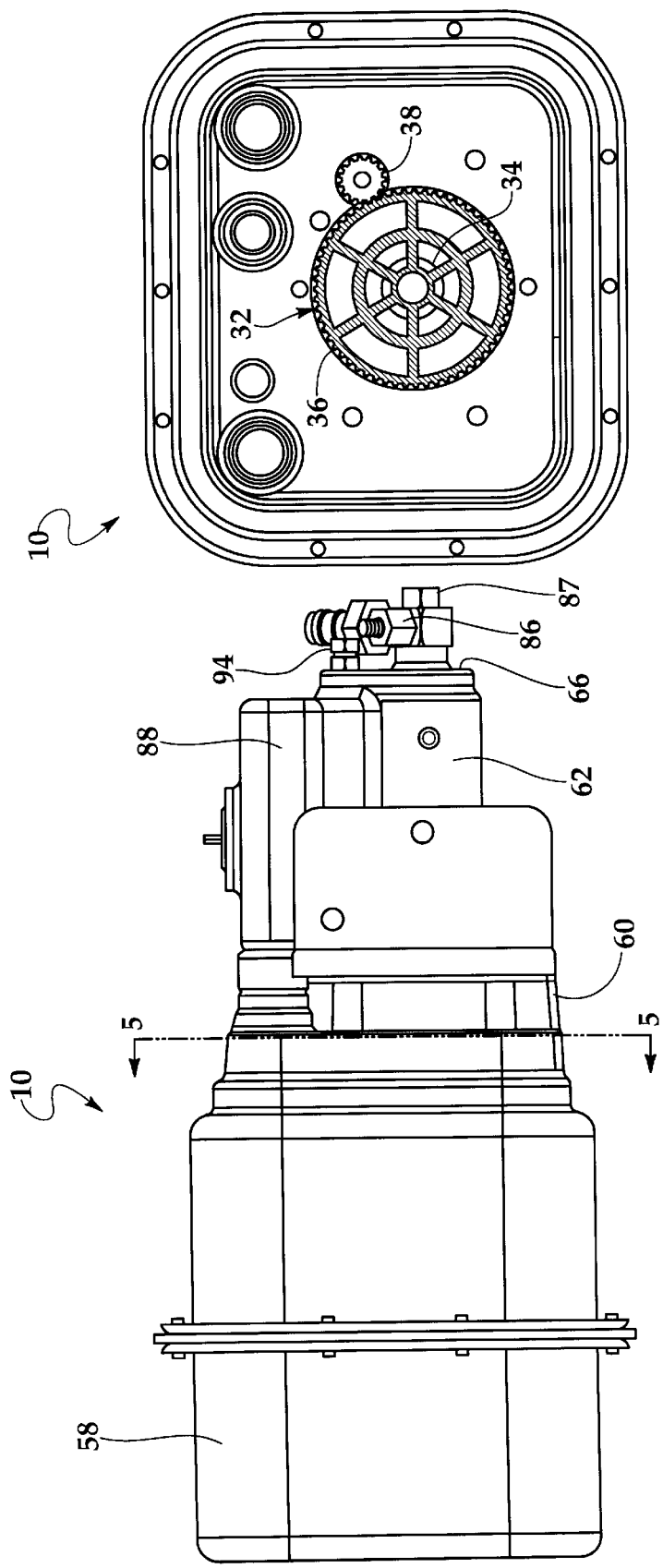
FIG. 4 is an elevational view of the slave operated self-contained hydraulic brake system of FIG. 1.
FIG. 5 is a cutaway sectional view of the slave operated self-contained hydraulic brake system of FIG. 1 taken along section line 5—5 of FIG. 4.

In an alternate embodiment shown in FIGS. 1A and 3A, first end 48 of threaded rod 46 has a magnet (not shown) mounted on or in rod 46 which triggers a hall effect limit switch 57 mounted on torque tube 40. Switch 57 indicates both reverse and forward limits.

A master cylinder adapter 60 is affixed to the second side 16 of the gear housing 12. A master cylinder 62 has a first end 64 and a second end 66. The first end 64 is affixed to gear housing 12. A master cylinder piston assembly 68 is slidably located within the master cylinder 62. The master cylinder piston assembly 68 (FIGS. 3 and 6) has a recessed area 70 on a first end 72. Master cylinder piston assembly 68 also has a second end 74. The recessed area 70 is provided to receive the second end 50 of the threaded rod 46.

A master cylinder chamber 76 is defined by an inner surface of the master cylinder 62, the second end 74 of the master cylinder piston assembly 68, and the second end 66 of the master cylinder 62. A primary cup or seal 78 is provided on the second end 66 of the master cylinder 62 for sealing hydraulic fluid 80 within the master cylinder chamber 76. Seal 78 is preferably elastomeric. A spring plate 82 is provided adjacent seal 78. A spring 84 is located within the master cylinder chamber 76. The spring 84 biases against spring plate 82 and against second end 66 of master cylinder 62 for biasing threading rod 46 away from second end 66 of master cylinder 62.

A pressure sensor 86 (FIGS. 1, 1A, 4, 6 and 7) is provided on a master cylinder outlet 87, which communicates with hydraulic lines that activate the brakes. Master cylinder outlet 87 is located on a second end 66 of the master cylinder 62. Pressure sensor 86 communicates with master cylinder chamber 76. A fluid reservoir 88 is preferably located adjacent the master cylinder chamber 76. The fluid reservoir 88 communicates with the master cylinder chamber 76 via a first or fluid return port 90 and a second or timing port 92. First port 90 and second port 92 are provided to allow hydraulic fluid to flow from the fluid reservoir 88 to the master cylinder chamber 76 as needed. A fluid level sensor 94 (FIGS. 1, 1A, 4, 6 and 7) communicates with an interior of the fluid reservoir 88.

Figure 7:
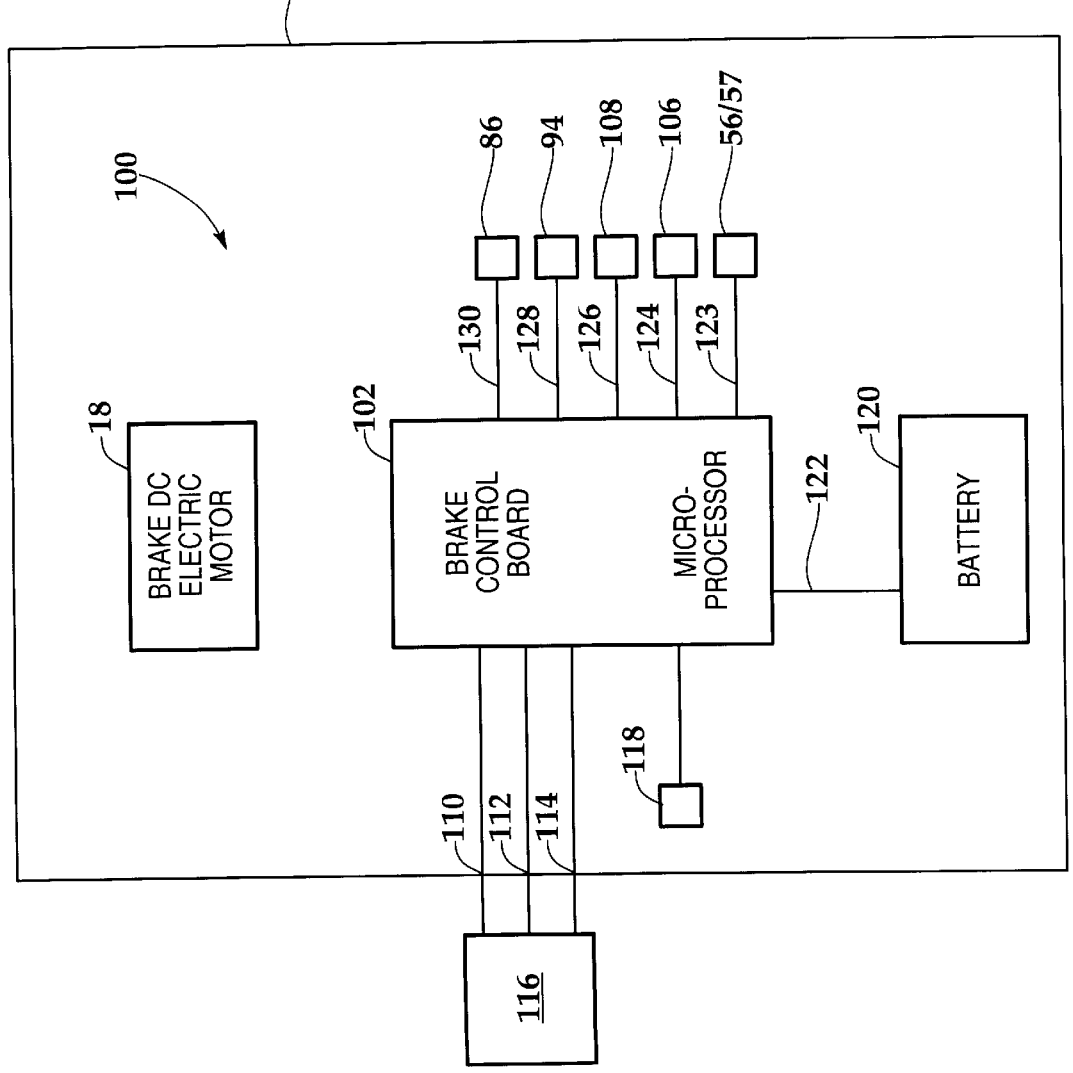
FIG. 7 is an overall block diagram of the control circuitry used for controlling the slave operated self-contained hydraulic brake system of FIG. 1.

Referring now to FIG. 7, a brake control system 100 is preferably carried on towed vehicle 101. Brake control system 100 has a brake control board 102, which has a micro processor 104. FIG. 7 is a schematic of the various electrical signal and electrical power wires attached to the brake control board 102. The brake control board 102 is in operative communication with the electric motor 18, the pressure sensor 86, the fluid level sensor 94, a load sensor 106, an anti-lock brake sensor 108, limit switch 56 or 57, and break-away switch 118. Load sensor 106 is provided on a towed vehicle 101 to sense the weight of the towed vehicle 101. A ground wire 110, a power wire 112 and a brake signal wire 114 each communicate a towing vehicle 116 with the brake control system 100. Break-away switch 118 is provided to break continuity and signal to control board 102 to stop towed vehicle 101 if it separates from the towing vehicle 116. Limit switch 56 or 57 indicates the position of rod 46 to control board 102, so that control board 102 can stop movement of rod 46 when it reaches its preferred limits of travel.

Towed vehicle 101 preferably carries a backup battery 120 that is in communication with the brake control board 102 via battery cables 122. Limit switch wires 123 communicate the limit switch 56 or 57 with control board 102. Load sensor wires 124 communicate the load sensor 106 to with the brake control board 102. Anti-lock sensor wires 126 communicate the anti-lock brake sensor 108, which is located on the towed vehicle 101 with the brake control board 102. If the control board 102 detects a condition of wheel lock on towed vehicle 110, control board 102 instructs electric motor 18 to move rod 46 such that pressure of hydraulic fluid 80 is adjusted to alleviate the wheel lock condition. Fluid level sensor wires 128 communicate the fluid level sensor 94 with the brake control board 102. Pressure sensor wires 130 communicate the pressure sensor 86 with the brake control board 102.

Figure 8:
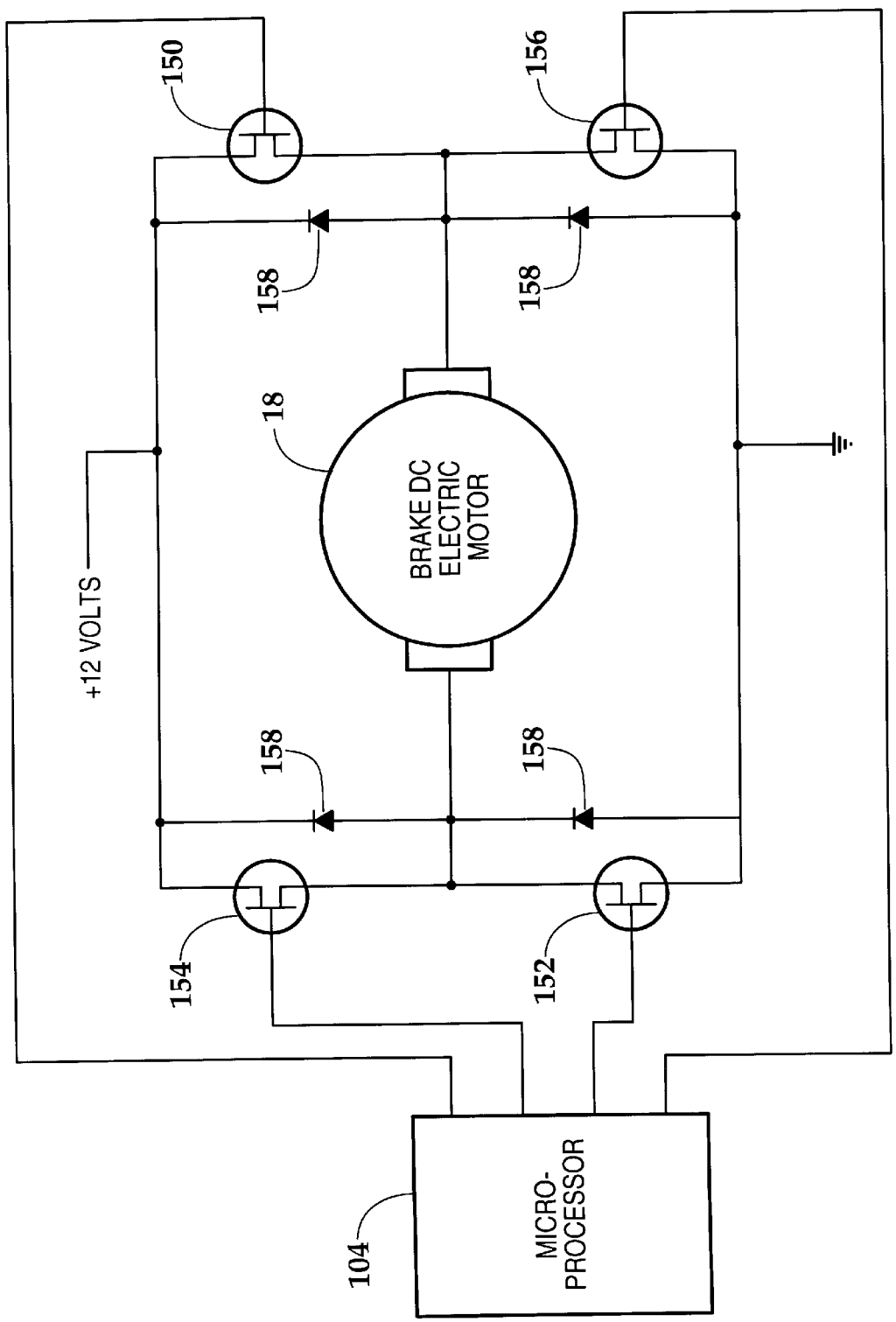
FIG. 8 is an illustrative circuit diagram of the control circuitry.

Referring now to FIG. 8, shown is a circuit diagram for controlling the electric motor 18 with the microprocessor 104.

FIG. 8 shows how the microprocessor 104 is wired to the brake DC electric motor 18 as well as the orientation of the four field effect transistors (FETs), Forward High Side Driver 150, Forward Low Side Driver 152, Reverse High Side Driver 154, Reverse Low Side Driver 156, and the four diodes 158 orientation and wiring.

Figure 6:
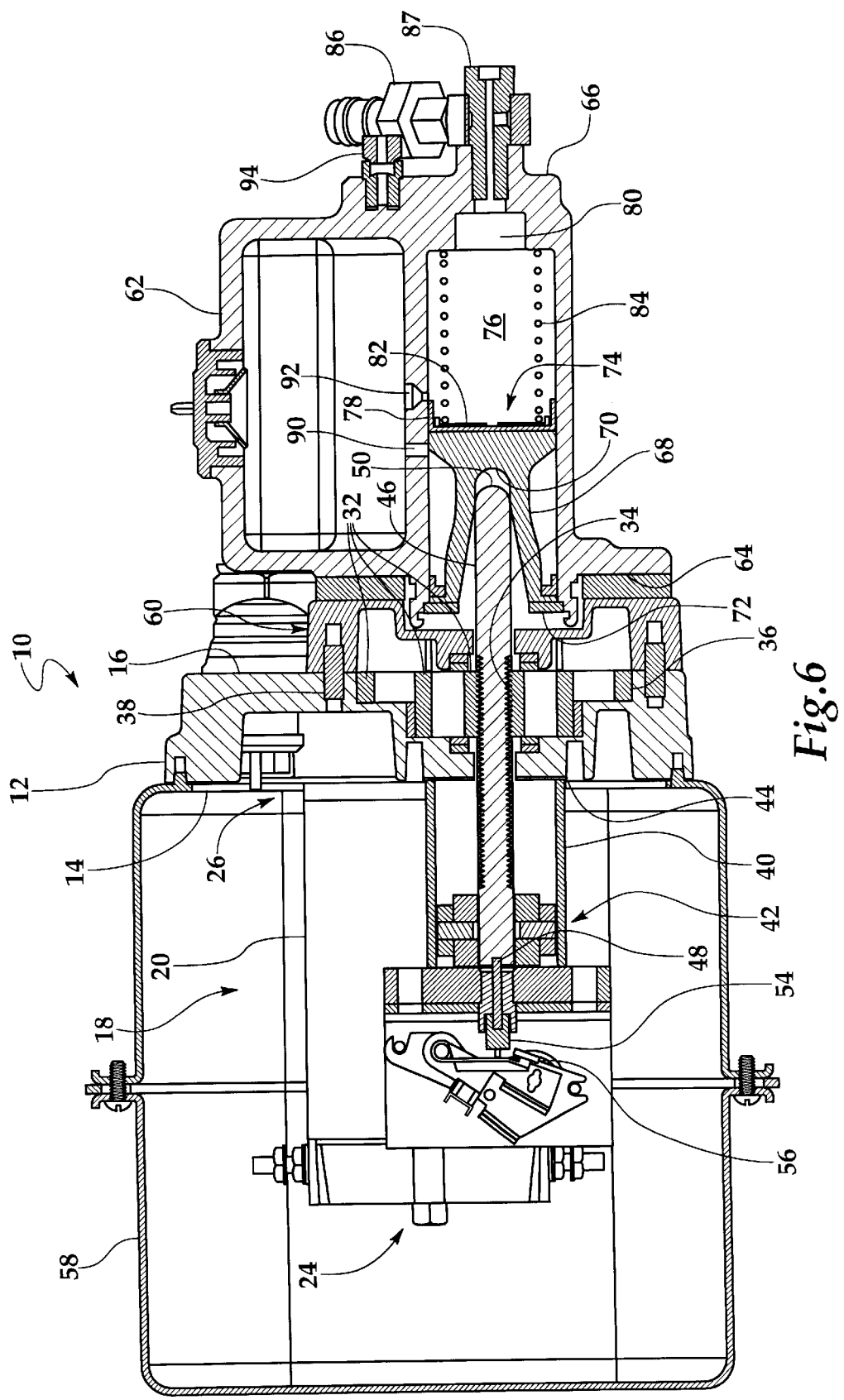
FIG. 6 is a cross section view of the slave operated self-contained hydraulic brake system taken along section line 6—6 of FIG. 2.

Referring to FIGS. 1–8, the mechanical operation of slave operated self-contained hydraulic brake system is as follows. When direct current electric power is applied to the armature 22 (FIG. 3) of electric motor 18, the armature 22 rotates within the housing 20 of electric motor 18 and in turn rotates the pinion gear 38 (FIGS. 1, 3, 5 and 6). The teeth of the pinion gear 38 make contact with and match external threads or teeth 38 of the larger spur gear 32 (FIGS. 1, 3, 5 and 6) and rotate the spur gear 32. This rotation results in a high rotational torque advantage upon the spur gear 32, i.e., many rotations from the pinion gear 38 are required for one rotation of the spur gear 32. The rotation of the spur gear 32 rotates internal threads 34 of the spur gear 32, which engage threaded rod 46. This rotation causes threaded rod 46 to move laterally depending upon the direction of the rotation of spur gear 32. When advanced laterally in one direction, the threaded rod 46 makes contact with the master cylinder piston assembly 68 (FIGS. 3 and 6).

As a result of a brake application signal, the electric motor 18, armature 22, pinion gear 38 and spur gear 32 will rotate in a direction that causes the threaded rod 46 to move in the direction of the master cylinder piston assembly 68 and into the hydraulic master cylinder 62. This displacement of the threaded rod 46 will in turn displace the master cylinder piston assembly 68, compress the master cylinder piston spring 84, and increase the pressure of the hydraulic fluid 80 within the hydraulic master cylinder 62. Additionally, the increase in pressure of hydraulic fluid 80 will cause the hydraulic fluid 80 to flow through master cylinder outlet 87 and into a hydraulic line or connection 89 and apply hydraulic pressure to a brake 91 (FIG. 3) of trailer or towed vehicle 101. The pressure application to the trailer system hydraulic brakes 91 will slow down and stop the towed vehicle or trailer 101.

Figure 9:
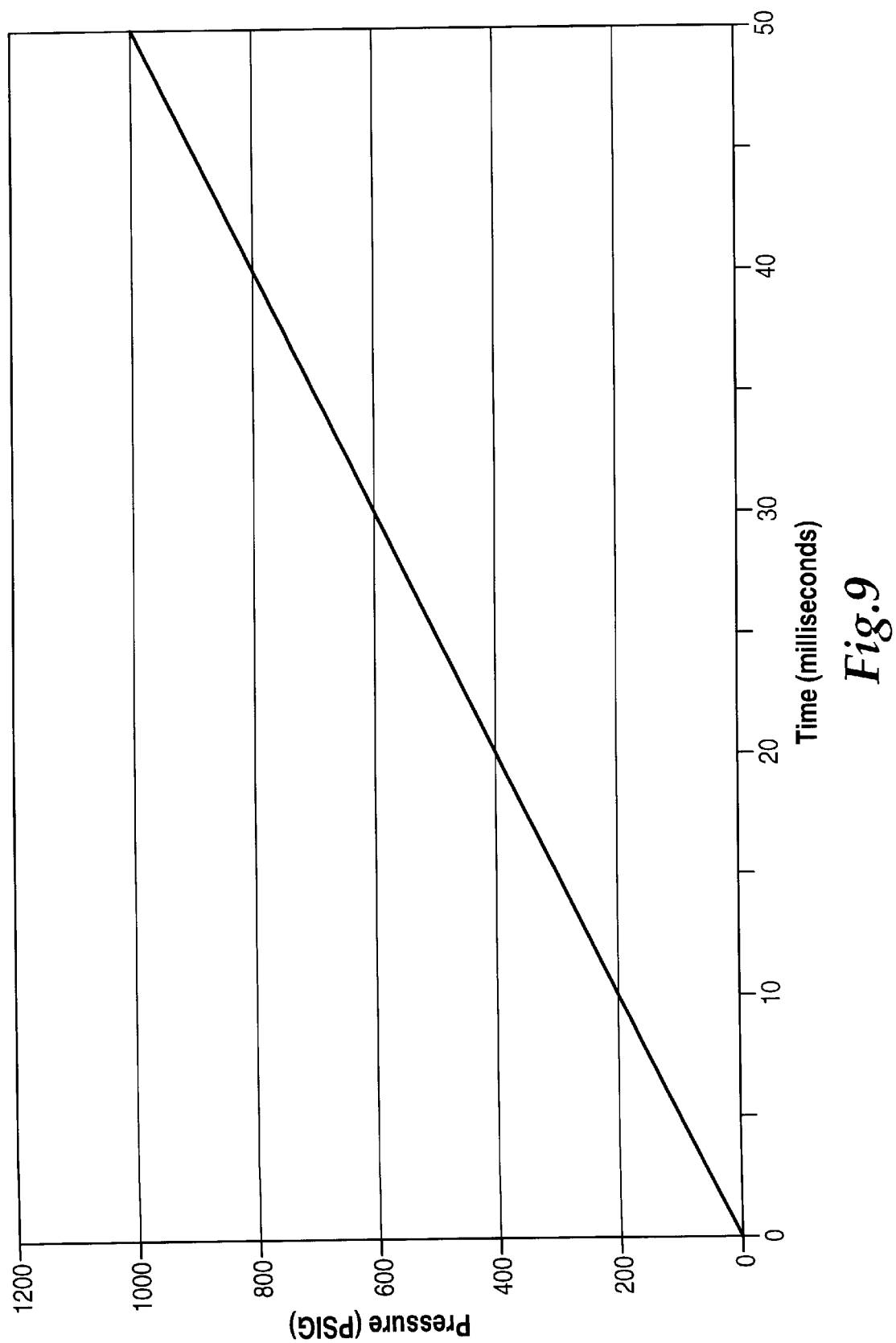
FIG. 9 is a graph depicting pressure increase over time of the slave operated self-contained hydraulic brake system of FIG. 1.
Figure 10:
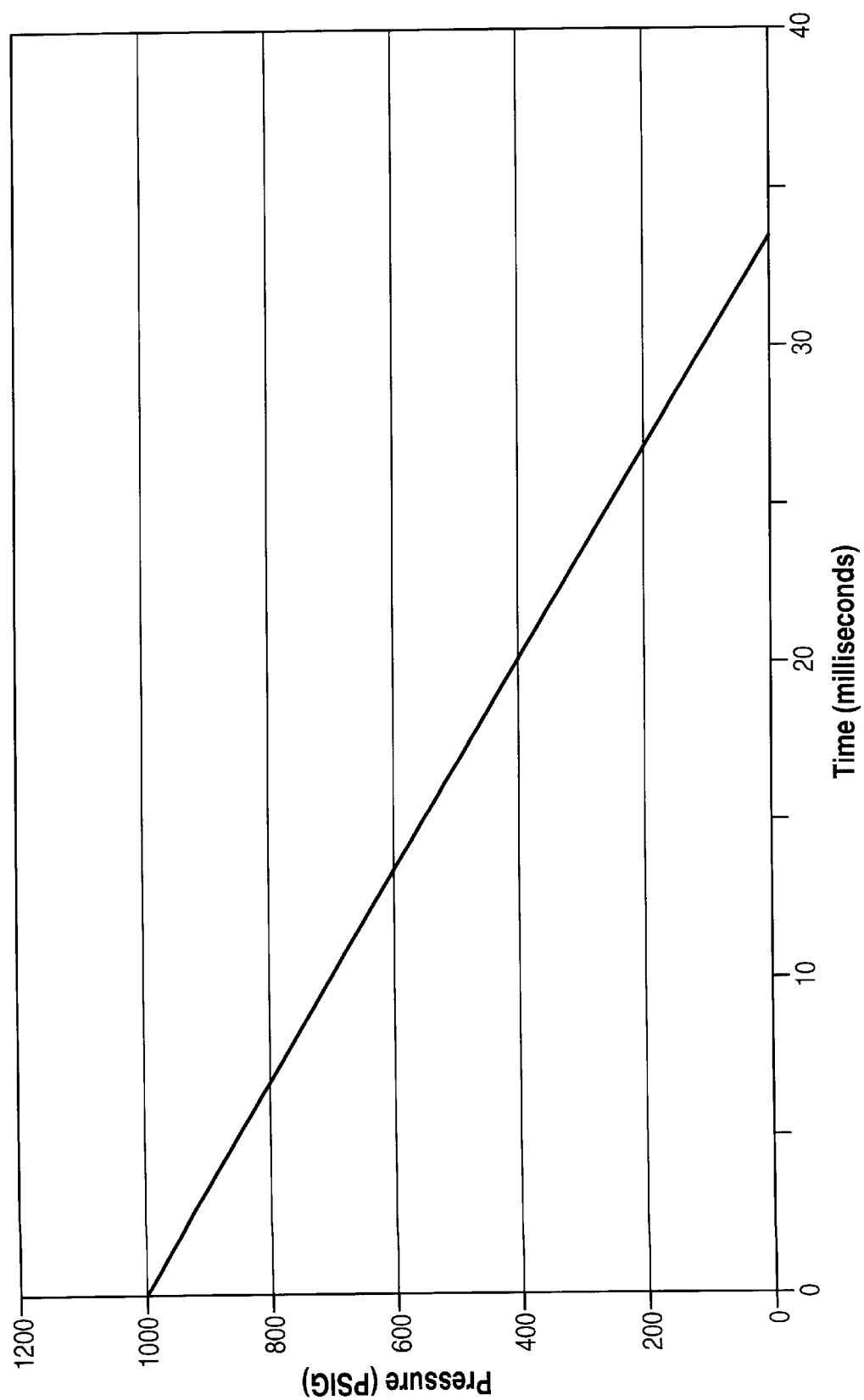
FIG. 10 is a graph depicting pressure release over time of the slave operated self-contained hydraulic brake system of FIG. 1

Release of the brake application signal results in current reversal to the electric motor 18, resulting in opposite direction rotation of the armature 22, pinion gear 38, spur gear 32 and threaded rod 46. This opposite rotation causes the threaded rod 46 to retract from within the hydraulic master brake cylinder 62. The master cylinder piston assembly 68 follows this retraction due to force applied by the master cylinder piston spring 84. This travel results in a pressure decrease of hydraulic fluid 80 and inflow into the master cylinder chamber 76 from the trailer brake system. This decrease in pressure results in retraction of the trailer system hydraulic brakes 91. The system is capable of rapidly increasing and releasing the hydraulic pressure for precise modulation (FIGS. 9 and 10), which is especially beneficial in control for anti-lock braking.

Referring more particularly to FIG. 7, the brake control board 102 monitors the voltage of the battery 120 for optimum charged voltage range. At such time that the voltage of battery 120 falls below a predetermined optimum minimum charged voltage range, the brake control board 102 will direct charging of the battery 120 until the battery 120 charge reaches a maximum value of the predetermined voltage range. At that time, the brake control board 102 will stop the charging of the battery 120. The result is that the battery 120 is always at optimum charge. The control board 102 also monitors and tests the battery 120 for charge capacity. For example, the control board 102 will put a temporary electric load on the battery 120 and test for voltage and voltage recovery time. At such time that the brake control board 102 detects that the battery 120 will no longer hold the predetermined required charge, it will send a message to the brake controller 100, which is preferably located on the towing vehicle 116, that the battery 120 needs replacement.

The signal from load sensor 106, as shown in FIG. 7, communicates to the main board 102, which monitors this signal for trailer weight. The main board microprocessor 104 is preferably programmed for a predetermined optimum brake pressure distribution curve and will adjust this curve based upon trailer weight. Therefore, optimum braking can be achieved automatically without operator intervention or adjustment. The optimum brake pressure distribution curve is preferably brake pressure as a function of linear travel of the acme threaded rod 46.

Still referring FIG. 7, when the brakes in the towing vehicle 101 are applied, a resulting brake signal is generated that is proportional to the deceleration of the towing vehicle 101. The brake signal is transmitted from towing vehicle 101 to brake control board 102. The brake control board 102 receives the proportional brake signal and calculates the amount of pressure of hydraulic fluid 80 within master cylinder 62 that is proportional to this signal. The brake control board 102 then initiates electric power application to the DC brake motor 18. This will result in rotation of the pinion gear 38, which rotates the spur gear 32 that results in axial movement of the threaded rod 46 with an increase in pressure of hydraulic fluid 80 in the hydraulic master cylinder 62. While applying power to the DC brake motor 18, the brake control board 102 monitors the signal from pressure sensor 86 for the pressure of hydraulic fluid 80 within master cylinder 62. When the monitored pressure from the pressure sensor 86 reads the same value as the calculated proportional pressure, the brake control board 102 will cease applying electrical power to the DC brake electric motor 18. If the brakes of towing vehicle 116 are applied to a greater degree, the proportional brake signal will increase and the brake control board 102 will increase the pressure of hydraulic fluid 80 as described above. This will result in greater braking for the towed vehicle 101. When the braking force of the towing vehicle 116 is reduced, the resulting proportional brake signal is reduced also, upon receipt of this proportional brake signal, the brake control board 102 reduces the pressure of hydraulic fluid 80, which reduces the amount of trailer braking.

FIG. 8 is a schematic that shows how the microprocessor 104 on the brake control board 102 controls the brake DC electric motor 18 amount of rotation, direction of rotation and time of rotation. The circuit shown is a common "H" bridge with four diodes 158. The positive 12 volts is applied to the top of the circuit and is isolated from the brake DC electric motor 18 by the orientation of the diodes 158. The motor 18 is isolated from the 12 volt positive voltage on the outside lines due to the presence of four field effect transistors (FETs) referred to as the forward high side driver 150, the forward low side driver 152 and the reverse high side driver 154 and the reverse low side driver 156. When there is an absence of a signal from microprocessor 104 to these FETs, these FETs are in effect an open circuit. The application of a signal to an FET from the microprocessor 104 will cause these FETs to allow current to flow through them and becoming in effect a closed circuit. Therefore, when conditions are such that a program within the microprocessor 104 is to turn on the brake DC electric motor 18 in the forward direction, it will send a voltage signal to the forward high side driver FET 150 and the forward low side driver FET 152 that will in turn activate these two FETs such that these FETs will allow a voltage of 12 volts to be applied to the brake DC electric motor 18. This voltage application will cause the brake DC electric motor 18 to turn in the "forward" direction and activate the brake system 100. When the brake DC electric motor 18 needs to be turned off, the signals to these two FETs will be removed, the voltage will no longer be applied to the brake DC electric motor 18 and the motor will cease rotating.

Since this system uses a linear actuator instead of hydraulic accumulator and rotational hydraulic pump, it will be able to maintain brake application in the event of a breakaway. The system of the invention will lock the brake down after breakaway, easily meeting the 15 minute hold period required by law. A bleed button may be provided to relieve pressure within the system to allow the trailer to be moved off the road or moved about by holding down the button. Preferably, the bleed button is positioned such that it can be wedged open if need be.

The previous description is of a preferred embodiment for implementing the invention, and the scope of the invention should not necessarily be limited by this description. The scope of the present invention is instead defined by the following claims.

What is claimed is:

1. A hydraulic brake system comprising:
    an electric motor mounted on a housing;
    a rod that passes through said housing, said rod having a first end and a second end and movable in a first lateral direction and a second lateral direction by said electric motor;
    a master cylinder proximate said rod, said master cylinder at least partially defining a master cylinder chamber;
    a master cylinder piston assembly slidably received within said master cylinder chamber, said master cylinder piston assembly having a first end for receiving said second end of said rod when said rod is moved in a second direction, wherein said master cylinder piston assembly forces fluid out of said master cylinder chamber;
    a torque tube connected to said housing and encompassing at least a portion of said rod; and
    a limit switch proximate said torque tube for sensing a lateral position of said rod.

2. The hydraulic brake system according to claim 1 further comprising:
    a pinion gear mounted on said housing and driven by said electric motor;
    a spur gear mounted on said housing and in communication with said pinion gear, said spur gear having internal threads on an inner surface of said spur gear; and
    external threads on an exterior surface of said rod for engaging said internal threads of said spur gear, for facilitating lateral movement of said rod as a result of rotation of said spur gear relative to said rod.

3. The hydraulic brake system according to claim 1 further comprising a microprocessor in communication with said limit switch for receiving a signal from said limit switch, wherein said microprocessor deactivates said electric motor upon receipt of the limit switch signal.

4. The hydraulic brake system according to claim 1 further comprising:
    a pressure sensor in communication with said master cylinder chamber for sensing pressure of said fluid within said master cylinder chamber; and
    a microprocessor in communication with said pressure sensor for receiving a signal from said pressure sensor, wherein said microprocessor determines the appropriate position of said rod to effect a desired pressure of said fluid.

5. The hydraulic brake system according to claim 1 further comprising:
    a fluid reservoir for providing fluid to said master cylinder chamber;
    a fluid level sensor in communication with said fluid reservoir; and
    a microprocessor in communication with said fluid level sensor for receiving a signal from said fluid level sensor.

6. The hydraulic brake system according to claim 1 further comprising:
    a load sensor on a towed vehicle for sensing a weight of said towed vehicle;
    a pressure sensor in communication with said master cylinder chamber for sensing pressure of said fluid within said master cylinder chamber; and
    a microprocessor in communication with said pressure sensor and said load sensor for receiving a signal from said pressure sensor and from said load sensor, wherein said microprocessor determines the appropriate position of said rod to effect a desired pressure of said fluid as a function of a weight of said towed vehicle.

7. The hydraulic brake system according to claim 1 further comprising:
    an anti-lock brake sensor on a towed vehicle for sensing a condition of wheel lock on said towed vehicle; and
    a microprocessor in communication with said anti-lock brake sensor for receiving a signal from said anti-lock brake sensor.

8. The hydraulic brake system according to claim 1 further comprising:
    a backup battery in communication with a microprocessor for supplying power to a control board if a primary power source is disconnected from said microprocessor.

9. A method of braking a towed vehicle comprising:
    providing an electric motor on the towed vehicle;
    moving a rod having a first end and a second end in a second lateral direction with said electric motor;
    contacting and moving a master cylinder piston assembly that is slidably received within a master cylinder chamber when said rod is moved in said second lateral direction;
    forcing hydraulic fluid out of said master cylinder chamber and into a hydraulic line to actuate a brake of said towed vehicle;
    moving said rod in a first lateral direction with said electric motor;
    triggering a limit switch with said rod when said rod is moved in said first lateral direction;
    signaling a microprocessor with said limit switch; and
    deactivating said electric motor with said microprocessor.

10. The method according to claim 9 further comprising the steps of:
    rotating a pinion gear with said electric motor;
    rotating a spur gear with said pinion gear, said spur gear having internal threads on an inner surface of said spur gear; and
    laterally moving said rod as a result of rotation of said spur gear relative to said rod.

11. The method according to claim 9 further comprising the steps of:
    sensing a fluid pressure with a fluid pressure sensor fluid within said master cylinder chamber;
    communicating said pressure to a microprocessor; and
    determining an appropriate position of said rod to effect a desired pressure of said fluid.

12. The method according to claim 9 further comprising the steps of:
    providing fluid to said master cylinder chamber from a fluid reservoir;
    sensing a fluid level in said fluid reservoir with a fluid level sensor; and
    communicating said fluid level to a microprocessor.

13. The method according to claim 9 further comprising the steps of:

sensing a weight of said towed vehicle with a load sensor;
sensing pressure of said fluid within said master cylinder chamber with a pressure sensor;
communicating said weight and said pressure to a microprocessor; and
determining an appropriate position of said rod to effect a desired pressure of said fluid as a function of a weight of said towed vehicle.

14. The method according to claim 9 further comprising the steps of:
sensing a condition of wheel lock on said towed vehicle with an anti-lock brake sensor;
communicating said condition to a microprocessor; and
adjusting a position of said rod to eliminate said condition of wheel lock.

15. The method according to claim 9 further comprising the steps of:
a backup battery in communication with a microprocessor for supplying power to a control board if a primary power source is disconnected from said microprocessor.

16. A hydraulic brake system comprising:
a gear housing having a first side and a second side;
an electric motor having first end and a second end that is connected to said first side of said gear housing;
a spur gear rotatably mounted on said first side of said gear housing, said spur gear having internal threads and external threads;
a pinion gear rotatably affixed to said first side of said gear housing, said pinion gear driven by said motor and in communication with said external threads of said spur gear;
a torque tube having a first end and a second end, said second end affixed to said first side of said gear housing;
a threaded rod having a first end and a second end, said threaded rod extending through said gear housing and threadably coupled to said internal threads of said spur gear;
a limit switch mounted on said torque tube and located proximate said first end of said threaded rod;
a master cylinder adapter affixed to said second side of said gear housing;
a master cylinder having a first end and a second end wherein said first end is affixed to said master cylinder adapter;
a master cylinder piston assembly slidably located within a master cylinder chamber of said master cylinder, said master cylinder piston assembly having first end and a second end, said master cylinder piston assembly having recessed area on a first end and a second end, said recessed area for receiving said second end of said threaded rod;
a spring within said master cylinder chamber, said spring for biasing against said master piston assembly for biasing said threaded rod away from said second end of said master cylinder via said master cylinder piston assembly.

17. The hydraulic brake system according to claim 16 further comprising:
a pressure sensor in communication with said master cylinder chamber; and
a microprocessor in communication with said pressure sensor.

18. A hydraulic brake system comprising:
an electric motor mounted on a housing;
a rod that passes through said housing, said rod having a first end and a second end and movable in a first lateral direction and a second lateral direction by said electric motor;
a master cylinder proximate said rod, said master cylinder at least partially defining a master cylinder chamber;
a master cylinder piston assembly slidably received within said master cylinder chamber, said master cylinder piston assembly having a first end for receiving said second end of said rod when said rod is moved in a second direction, wherein said master cylinder piston assembly forces fluid out of said master cylinder chamber;
a load sensor on a towed vehicle for sensing a weight of said towed vehicle;
a pressure sensor in communication with said master cylinder chamber for sensing pressure of said fluid within said master cylinder chamber; and
a microprocessor in communication with said pressure sensor and said load sensor for receiving a signal from said pressure sensor and from said load sensor, wherein said microprocessor determines the appropriate position of said rod to effect a desired pressure of said fluid as a function of a weight of said towed vehicle.

19. A hydraulic brake system comprising:
an electric motor mounted on a housing;
a rod that passes through said housing, said rod having a first end and a second end and movable in a first lateral direction and a second lateral direction by said electric motor;
a master cylinder proximate said rod, said master cylinder at least partially defining a master cylinder chamber;
a master cylinder piston assembly slidably received within said master cylinder chamber, said master cylinder piston assembly having a first end for receiving said second end of said rod when said rod is moved in a second direction, wherein said master cylinder piston assembly forces fluid out of said master cylinder chamber;
an anti-lock brake sensor on a towed vehicle for sensing a condition of wheel lock on said towed vehicle; and
a microprocessor in communication with said anti-lock brake sensor for receiving a signal from said anti-lock brake sensor.

20. A method of braking a towed vehicle comprising:
providing an electric motor on the towed vehicle;
moving a rod having a first end and a second end in a second lateral direction with said electric motor;
contacting and moving a master cylinder piston assembly that is slidably received within a master cylinder chamber when said rod is moved in said second lateral direction;
forcing hydraulic fluid out of said master cylinder chamber and into a hydraulic line to actuate a brake of said towed vehicle;
sensing a weight of said towed vehicle with a load sensor;
sensing pressure of said fluid within said master cylinder chamber with a pressure sensor;
communicating said weight and said pressure to a microprocessor; and
determining an appropriate position of said rod to effect a desired pressure of said fluid as a function of a weight of said towed vehicle.

21. A method of braking a towed vehicle comprising:
providing an electric motor on the towed vehicle;
moving a rod having a first end and a second end in a second lateral direction with said electric motor;
contacting and moving a master cylinder piston assembly that is slidably received within a master cylinder chamber when said rod is moved in said second lateral direction;

forcing hydraulic fluid out of said master cylinder chamber and into a hydraulic line to actuate a brake of said towed vehicle;

sensing a condition of wheel lock on said towed vehicle with an anti-lock brake sensor;

communicating said condition to a microprocessor; and adjusting a position of said rod to eliminate said condition of wheel lock.

\* \* \* \* \*

UNITED STATES PATENT AND TRADEMARK OFFICE
CERTIFICATE OF CORRECTION

PATENT NO.     : 6,416,138 B1
DATED          : July 9, 2002
INVENTOR(S)    : William Lunceford Barnett It is certified that error appears in the above-identified patent and that said Letters Patent is hereby corrected as shown below:

<u>Column 4,</u>
Line 43, replace "sensor 106 to with" with -- sensor 106 with --
Line 48, replace "vehicle 110," with -- vehicle 101, --
Line 60, replace "(FETs)," with -- (FETs); --

Signed and Sealed this

Twelfth Day of August, 2003

JAMES E. ROGAN
*Director of the United States Patent and Trademark Office*